United States Patent Office 3,542,646
Patented Nov. 24, 1970

3,542,646
PROCESS FOR FRACTIONALLY OBTAINING UROKINASE AND BLOOD COAGULATION ACCELERATOR IN HUMAN URINE
Nobuo Aoki, Denver, Colo., and Toshio Asada, Tokyo, Japan, assignors to The Green Cross Corporation, Osaka, Japan, a corporation of Japan
No Drawing. Filed Nov. 15, 1967, Ser. No. 683,157
Claims priority, application Japan, Nov. 22, 1966, 41/76,615
Int. Cl. C07g 7/026
U.S. Cl. 195—66
10 Claims

ABSTRACT OF THE DISCLOSURE

Process for obtaining urokinase and/or blood coagulation accelerator from human urine: Barium sulfate is added to fresh human urine adjusted to pH 4.5, and the adsorbates are eluted with 5% sodium citrate. Ammonium sulfate is added to this eluate, and the precipitate is dissolved in distilled water, dialyzed and precipitated at isoelectric point. Using phosphate buffer, the precipitate is dissolved, dialyzed, and subjected to a hydroxylapatite column chromatography and eluted in step-wise using 0.05, 0.15, 0.2, 0.3 and 0.4 mol-phosphate buffer. Urokinase exists in 0.3 mol fraction, blood coagulation accelerator in 0.2 and 0.3 mol fractions.

---

Both fractions are precipitated with a 66% saturation of ammonium sulfate and dialyzed, respectively. Urokinase is further purified by diethylaminoethyl cellulose chromatography with tris-hydrochloric acid buffer, and blood coagulation accelerator by gel filtration.

Both substances obtained are electrophoretically single on cellulose acetate membrane, respectively. Urokinase enzymatically activates human plasminogen and 1–4 μg. of the blood coagulation accelerator corrects blood coagulation disorder of 1 ml. of hemophilic plasma.

The present invention relates to a process for fractionally obtaining plasminogen-activating substance (urokinase) and blood coagulation accelerator in high purity.

As to the former, namely urokinase, various separation methods thereof have been devised so far. As literatures for these methods, for example, Ploug J., and Kjeldgaard, N. B.: Biochem. Biophys. Acta., vol. 24, 278 (1957); Sgouris, J. T., Storey, R. W., McCall, K. B. and Anderson, H. D.: Vox Sang., vol. 7, 739 (1962); Celander, D. R., and Guest, M. M.: Am. J. Cardiol., vol. 6, 409 (1960) can be referred to. But, all the methods give impure products and contain other proteins as contaminants.

As for the latter, that is, blood coagulation accelerator, the existance thereof generally has not yet been well recognized world-widely, consequently, as purification method, only a method which uses a filter has been reported by one of the present inventors, moreover, purities of products obtained by this method are extremely inferior. The present inventors have invented a process for fractionally separating and purifying simultaneously the both substances, urokinase (abbreviated to U below) and blood coagulation accelerating substance (abbreviated to K below) by a process entirely different from the conventional methods.

The process of the present invention is a novel method which has never been reported at all so far, which initially enabled us to obtain urokinase and blood coagulation accelerator in high purity and can greatly contribute to therapy of thrombus and haemorrhagic predisposition as well as to various kinds of medical studies.

The outline of the present method is as follows:

U and K are adsorbed to barium sulfate from human urine adjusted to pH 4.5, eluted with citrate, and a fraction precipitated by 66% saturation of ammonium sulfate is collected. This fraction then subjected to isoelectric point-precipitation at pH 3.5 after dialysis against distilled water. The precipitated substance contains the both substances of U and K in high concentrations and the above mentioned procedure shows that the both substances can be obtained at the same time simply and efficiently, which is extremely characteristics.

Because of coexistence of viscous and inactive mucoproteins as impurities, further purifications are extremely difficult and can be achieved only when a procedure of hydroxylapatite chromatography devised by the present invention is applied. "Hydroxylapatite" is a known substance prepared from disodium hydrogen phosphate and calcium chloride and considered to be $Ca_5(PO_4)_3OH$. The hydroxylapatite chromatography can mutually separate U and K partially by adsorbing the both substances U and K in phosphate buffer of $1/10$ mol–$1/100$ mol in a range of pH 6.4–pH 7.0, followed by elution process using step-wisely elevated buffer concentrations to remove impure inactive proteins.

Namely, viscous mucoproteins are removed and subsequent purification process is facilitated only by the hydroxylapatite procedure of the present invention. Moreover, removal of substances showing strong toxicity with a slight amount, such as kallikrein etc. in urine which were very hardly eliminable becomes possible by this hydroxylapatite procedure. This hydroxylapatite procedure is the most important point in the present invention, and the fractional purification of the both substances U and K in the subsequent step achieved by diethylaminoethyl cellulose (abbreviated to DEAE cellulose) chromatography and further by gel filtration is made possible only after this procedure. As to DEAE cellulose chromatography, absorption is conditioned by adjusting pH in a range of 8.0–9.0 and using tris-buffer solution [tris(hydroxymethyl)-amino-methane+HCl] of $1/1000$ mol–$1/100$ mol, and elution is carried out by raising NaCl concentrations step-wisely from $1/100$ mol to 1 mol. The fractional purifications of U and K are mutually completed after this chromatography. K is also fractionally purified by a gel filtration with Sephadex G–200 (dextran gel crosslinked with epichlorohydrin, manufactured by Pharmacia, Uppsala, Sweden) or Bio-Gel P–300 (polyacrylamide gel, manufactured by Bio-Rad Laboratories, Richmond, California, U.S.A.) under such condition as pH 8.0–9.0.

Moreover, the present invention has not only a characteristic value at such point that urokinase and blood coagulation accelerator can be simultaneously collected and fractionally purified, but also can be established as a collecting method of individual substances which belongs to the scope of the present invention.

EXAMPLE

Fresh urine collected from many normal persons within several hours is adjusted to pH 4.5 by addition of 5 normal hydrochloric acid with sufficient stirring. Barium sulfate is immediately added at a ratio of 35 g. to 1 l. urine and stirred for 30 minutes at room temperature after thorough mixing. Barium sulfate used in this case is preliminarily treated by suspending in $1/200$ mol sodium citrate to completely remove barium sulfate which is as fine as escaping sedimentation after overnight-standing, subsequently filtering by suction of filter paper and further drying at 100° C. The human urine treated with barium sulfate as mentioned above is centrifuged to separate barium sulfate and the supernatant is decanted off. Barium sulfate sedimented by centrifugation is washed lightly with distilled water of $1/20$ volume of the original urine and substances adsorbed on barium sulfate are subsequently eluted by addition of 5% sodium citrate of 1/10 volume of the original urine and by stirring for 15 minutes. The eluate with citrate obtained by the centrifugation is then adjusted to pH 6.8 with 1 normal hydrochloric acid, to which solid ammonium sulfate is added at a ratio of 430 g. to 1 l., stirred below 4° C. for 30 minutes and allowed to stand for further 3 hours below 4° C. Sediments thus formed are centrifuged and dissolved with distilled water of 1/100 volume of the original urine, which is further dialyzed for 3 days below 4° C. After completion of the dialysis, water insoluble substances are removed and the residual solution is adjusted to pH 3.5 with 1 normal hydrochloric acid below 4° C. to achieve an isoelectric point-precipitation. Precipitate formed in about 10 minutes is centrifuged, dissolved with 1/100 mol phosphate buffer solution of pH 6.8 of 1/500 volume of the original urine and further dialyzed against said buffer solution.

In this step, U shows about 100–400 fold-rise of specific activity observed by extinction at 280 m$\mu$ compared with that of the original urine and yield is about 10%. K is purified to about 1000–3000 folds when estimated from correcting effect for blood coagulation disorder of patient blood of hemophilia A, and yield is about 5%.

The subsequent purification step is hydroxylapatite column chromatography. The conditions for its procedure are that substances are adsorbed by using 1/100 mol phosphate buffer solution of pH 6.8 and eluted by step-wisely raising concentrations of the phosphate buffer solution of the same pH in the order of 0.05, 0.1, 0.15, 0.2, 0.3 and 0.4 mol. U mainly exists in a fraction eluted by 0.3 mol, and K exists in fractions eluted by 0.2 mol and 0.3 mol. Both eluted fractions are precipitated by a 66% saturation of ammonium sulfate and concentrated, and sufficiently dialyzed with distilled water and successively with 1/250 mol tris-HCl buffer solution of pH 8.6 U is further purified by DEAE cellulose chromatography of 0.3 mol fraction. Adsorption is achieved in 1/250 mol tris-HCl buffer solution of pH 8.6 and adsorbed substances are eluted by the same buffer solution to which NaCl is added so that its concentration increases step-wisely as 0.01, 0.05, 0.1, 0.2, 0.3, 0.5 and 1.0 mol. U is eluted with 0.2 mol solution. K is further purified by subjecting fractions of 0.2 mol and 0.3 mol (or only a fraction of 0.2 mol) to gel filtration with the same buffer solution (1/250 mol tris-HCl buffer (pH 8.6)) using Sephadex G–200 or Bio-Gel P–300. They obtained both substances are electrophoretically single on cellulose acetate membrane. U enzymatically activates purified human plasminogen. K completely corrects blood coagulation disorder of 1 ml. of hemophilic plasma by addition of 1–4 $\mu$g thereof.

What we claim is:

1. A process for fractionally obtaining urokinase and/or blood coagulation accelerator in human urine, which comprises applying a hydroxylapatite chromatographic procedure to fractions containing urokinase and blood coagulation accelerator concentrated and separated from human urine by using a phosphate buffer of 1/10 mol to 1/100 mol in a pH range of 6.4 to 7.0, to absorb urokinase and/or blood coagulation accelerator in human urine therein, eluting by step-wise increase in concentrations of a phosphate buffer solution in a range of 0.05 to 0.4 mol, collecting fractions eluted by 0.2 mol and 0.3 mol concentrations and finally purifying the 0.3 mole fraction to obtain urokinase and both the 0.2 and 0.3 mol fractions to obtain blood coagulation accelerator.

2. A process for fractionally obtaining urokinase and/or blood coagulation accelerator in human urine, which comprises absorbing and collecting urokinase and blood coagulation accelerator simultaneously by addition of barium sulfate to human urine, eluting the urokinase and blood coagulation accelerator with 5% sodium citrate, applying a hydroxylapatite chromatographic procedure to the elute by using a phosphate buffer of 1/10 mol–1/100 mol in a pH range of 6.4 to 7.0 to absorb urokinase and/or blood coagulation accelerator in human urine therein, eluting by step-wise increase in concentrations of a phosphate buffer in a range of 0.05 to 0.4 mol, collecting fractions eluted by 0.2 mol and 0.3 mol concentrations and finally purifying the 0.3 mol fraction to obtain urokinase and both the 0.2 and 0.3 mol fractions to obtain blood coagulation accelerator.

3. A process for fractionally obtaining urokinase and blood coagulation accelerator from human urine which comprises adding barium sulfate to human urine adjusted to pH 4.5 to absorb urokinase and blood coagulation accelerator in human urine, eluting with citrate, adding ammonium sulfate to the eluate, separating formed precipitate, dissolving in distilled water, followed by dialysis and an isoelectric point-precipitaton at pH 3.5, dissolving this precipitate in phosphate buffer solution, further dialyzing against phosphate buffer solution, subjecting this to hydroxylapatite chromatography, eluting by step-wise increase in concentrations of the phosphate buffer solution, collecting fractions eluted by 0.2 mol and 0.3 mol concentrations and finally purifying the 0.3 mol fraction to obtain urokinase and both the 0.2 and 0.3 mol fractions to obtain blood coagulation accelerator.

4. A method according to claim 3, wherein barium sulfate is added at a ratio of 35 g. to 1 l. urine.

5. A method according to claim 3, wherein citrate used for elution is 5% sodium citrate 1/10 as much as the volume of the original urine.

6. A method according to claim 3, wherein citrate eluate is adjusted to pH 6.8 with hydrochloric acid to which solid ammonium sulfate is added at a ratio of 430 g. to 1 l. of this eluate.

7. A method according to claim 3, wherein an isoelectric point-precipitation at pH 3.5 is achieved below 4° C.

8. A method according to claim 3, wherein 1/100 mol phosphate buffer solution (pH 6.8) is used as a solvent for adsorption in a column chromatography of hydroxylapatite and elution is carried out by raising concentrations of the phosphate buffer solution step-wisely, i.e., 0.05, 0.1, 0.15, 0.2, 0.3 and 0.4 mol.

9. A method according to claim 3, wherein the purification of urokinase fraction is carried out by achieveing DEAE cellulose chromatography using 1/250 mol tris-HCl buffer solution (pH 8.6) as a solvent for adsorption and eluting with 1/250 mol tris-HCl buffer solution (pH 8.6) to which NaCl is added so that concentrations thereof are step-wisely raised according to 0.01, 0.05, 0.1, 0.2, 0.3, 0.5 and 1 mol.

10. A method according to claim 3, wherein a fraction of blood coagulation accelerator is purified by a gel filtration using 1/250 mol tris-HCl buffer solution (pH 8.6).

References Cited

UNITED STATES PATENTS 2,983,647  5/1961  Kjeldgaard et al. _____ 195—62 X
3,355,361  11/1967  Lesuk _____ 195—62

OTHER REFERENCES

Methods in Enzymology, vol. 5, 1962, pp. 27 to 32.

LIONEL M. SHAPIRO, Primary Examiner